United States Patent [19]
Takano et al.

[11] Patent Number: 5,612,686
[45] Date of Patent: Mar. 18, 1997

[54] METHOD AND AN APPARATUS FOR MONITORING THE ENVIRONMENT AROUND A VEHICLE AND AN OPERATION SUPPORT SYSTEM USING THE SAME

[75] Inventors: Kazuaki Takano, Mito; Naoyuki Tanaka, Abiko; Makoto Shioya, Tokyo; Takuya Imaide, Fujisawa; Kenichirou Kurata, Katsuta, all of Japan

[73] Assignee: Hitachi, Ltd., Tokyo, Japan

[21] Appl. No.: 313,777

[22] Filed: Sep. 28, 1994

[30] Foreign Application Priority Data

Sep. 28, 1993 [JP] Japan .................................. 5-240939

[51] Int. Cl.⁶ ..................................................... G08G 1/16
[52] U.S. Cl. ......................... 340/903; 180/169; 340/435; 348/148; 348/170; 369/461
[58] Field of Search ........................ 340/901, 903, 340/435; 356/4.01, 4.03; 180/169; 364/461; 348/148, 149, 169, 170, 113, 118

[56] References Cited

U.S. PATENT DOCUMENTS

| | | | |
|---|---|---|---|
| 3,603,929 | 9/1971 | Drysdale | 340/435 |
| 4,195,425 | 4/1980 | Leitz et al. | 180/169 |
| 4,931,937 | 6/1990 | Kakinami et al. | 340/937 |
| 5,230,400 | 7/1993 | Kakinami et al. | 180/169 |
| 5,410,346 | 4/1995 | Saneyoshi et al. | 348/118 |
| 5,420,792 | 5/1995 | Butsuen et al. | 340/903 |
| 5,461,357 | 10/1995 | Yoshioka et al. | 348/148 |
| 5,523,958 | 6/1996 | Takeuchi | 348/571 |

Primary Examiner—Brent A. Swarthout
Attorney, Agent, or Firm—Antonelli, Terry, Stout & Kraus, LLP

[57] ABSTRACT

Safety of the distance between vehicles is judged by monitoring whether or not an object other than a front road surface, namely, a preceding vehicle, exists in a predetermined area of the front road surface which is recognized by a picture processing unit used as a sensor for recognizing traffic states of the front road, without recognizing an image of a preceding vehicle having a complicated shape and a plurality of colors of the preceding vehicle by means of picture processing.

5 Claims, 15 Drawing Sheets

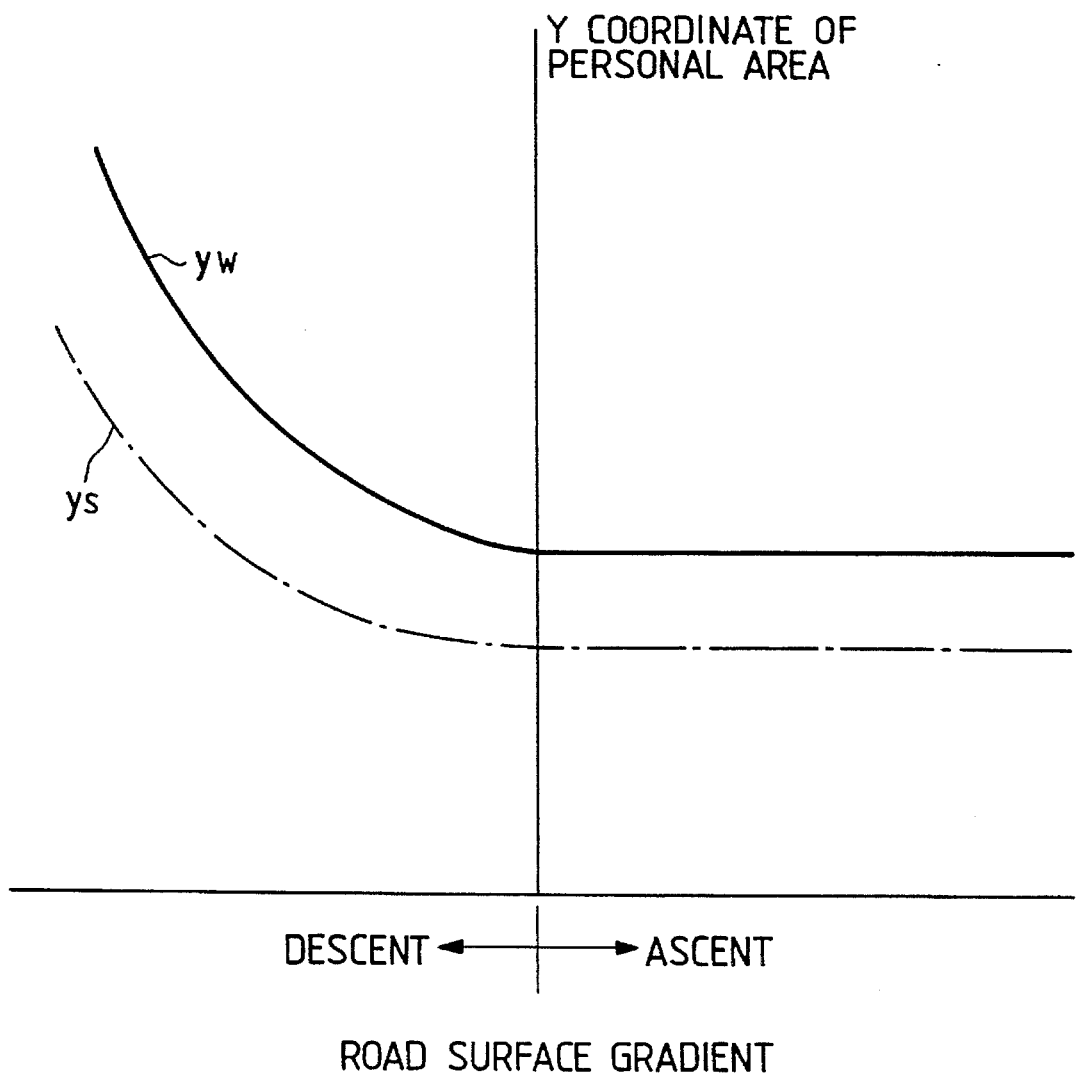

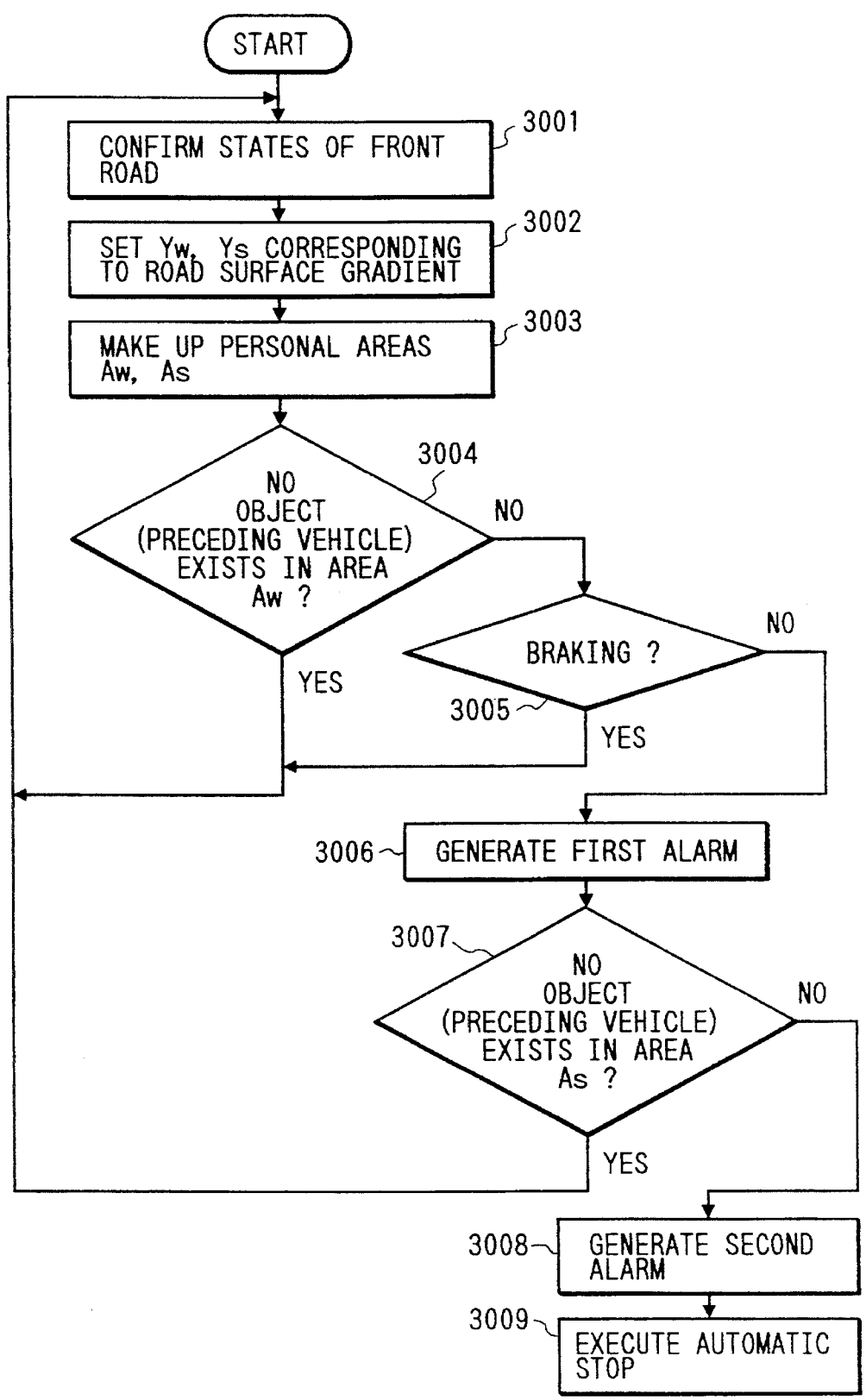

$y_w < y_v$ (FLAT ROAD)

$y_w > y_v$ (ROAD OF LARGE DESCENDANT GRADIENT)

METHOD AND AN APPARATUS FOR MONITORING THE ENVIRONMENT AROUND A VEHICLE AND AN OPERATION SUPPORT SYSTEM USING THE SAME

BACKGROUND OF THE INVENTION

The present invention relates to a method and an apparatus for monitoring traffic states around a vehicle by using picture information picked up by a picture pickup device, and further to an operation support system using the method and the apparatus.

Methods or apparatuses for maintaining a constant distance between a subject vehicle and a preceding vehicle or for operating the subject vehicle to follow a preceding vehicle by means of a picture processing technique using pictures of a front scene in the running direction, picked up by a picture pickup device, are described in Japanese Patent Applications Laid-Open No. 313200/1992, No. 172799/1983 and No. 291100/1990.

Since the above-mentioned techniques are based upon recognition of a preceding vehicle by using picture information, the techniques require processing of a large amount of picture information, and therefore, the implementation of such techniques requires a large capacity memory and an information processing device (computer) capable of super-high speed calculation.

Further, the techniques have a problem in that they need more information processing time if a road is curved since it is necessary under such circumstances to process more picture information for following the preceding vehicle.

SUMMARY OF THE INVENTION

The present invention has been achieved in consideration of the above-described problems, and has the aim of providing a method and an apparatus for monitoring the traffic states of a vehicle, and of providing an operation support system using the method and the apparatus and which is capable of largely reducing the amount of information to be processed and the information processing time, while downsizing the information processing device.

An object of the present invention is to generate signals or execute predetermined controls over a subject vehicle on detecting the appearance of a part, which can not be determined as a road, or the image of an object which is determined as a thing other than a road surface, in the predetermined front area of the front road surface area in the running direction of the subject vehicle, which are recognized by using picture information picked up by a picture pickup device.

And, by providing the above-mentioned functions, the present invention can generate or execute controls over the subject vehicle on detecting the indication of a vehicle in the predetermined front area in the running direction of the subject vehicle, which is displayed on a display device.

Further, a function to judge the curving of a road by applying a simple picture processing technique to road surface information obtained from picture information is also provided by the present invention.

By the present invention, the required memory capacity and the amount of processed information can be decreased by judging a safe distance between vehicles based not on recognition of a preceding vehicle itself having a complicated shape and plural colors and sizes, but on a determination as to whether an object other than a road surface (for example, a preceding vehicle) exists or not, or whether a part not recognized as a road surface exists or not in the predetermined area (the predetermined area in the running direction of the present vehicle) of the recognized front road surface.

BRIEF DESCRIPTION OF THE DRAWINGS

FIG. 11 is a diagram which shows the relation between Y coordinates of the personal areas and the gradient of a road used in the present invention.

FIG. 12 is a flow chart which shows a control flow of running operations in a traffic snarl performed by the control unit of the present invention.

DETAILED DESCRIPTION OF THE EMBODIMENTS

Figure 1:
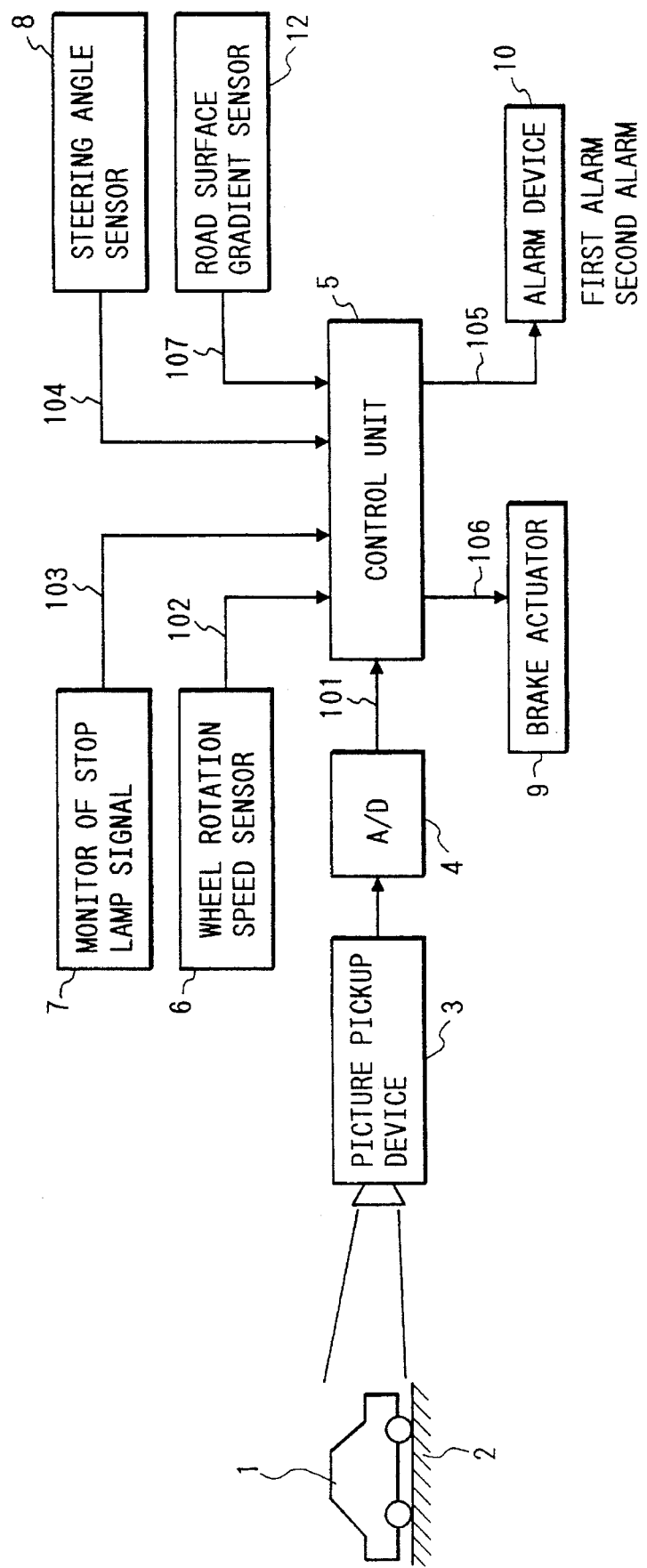
FIG. 1 is a schematic block diagram which shows the main constitution of an apparatus and an operation support system forming an embodiment of a present invention.

Hereinafter, details of the present invention will be explained based on embodiments illustrated in the drawings. In FIG. 1, the main constitution of an apparatus and an operation support system for monitoring traffic states around a vehicle according to an embodiment of the present invention is shown. A picture pickup device 3 such as a CCD camera for picking up a preceding vehicle 1 and a front road 2, etc. is connected to a control unit 5 via an A/D converter 4. A wheel rotation speed sensor 6, a monitor of a stop lamp signal 7 and a steering angle sensor 8 are connected to the input side of the control unit 5, and a brake actuator 9 and an alarm device 10 are connected to the output side of the control unit 5.

Figure 2:
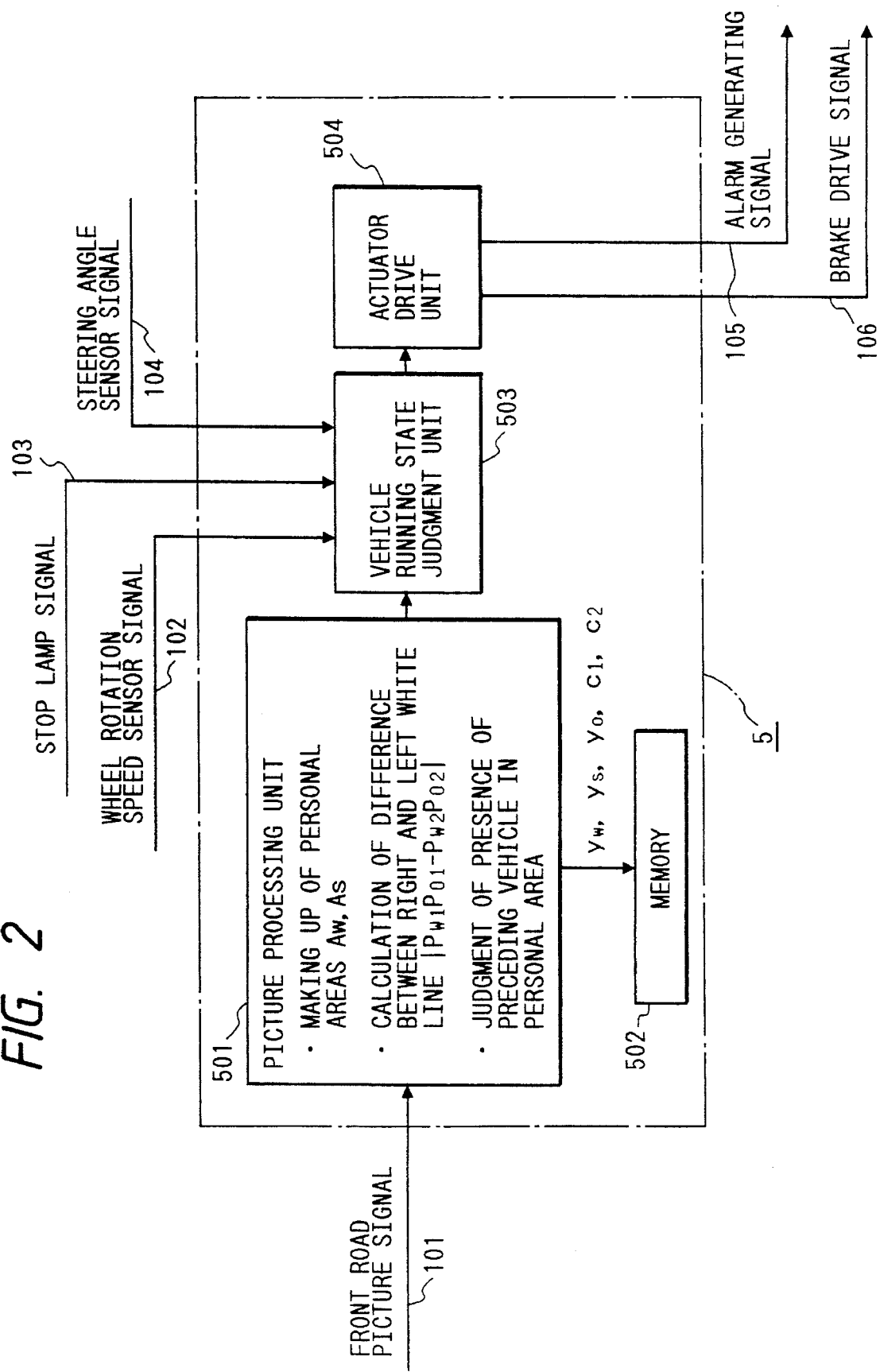
FIG. 2 is a block diagram which shows the constitution of a control unit of the apparatus and the operation support system of the present invention.

As shown in FIG. 2, the control unit 5 is composed of a picture processing unit 501 for processing picture information, a memory 502 for storing predetermined parameters ($y_w$, $y_s$, $y_o$, $c_1$, $c_2$), an actuator drive unit 504, a vehicle running state judgment unit 503 for judging running states of a vehicle and several kinds of memories which are not shown in the figure. Picture signals 101 converted to digital signals by the A/D converter 4 are input into the picture processing unit 501, and a wheel rotation speed sensor signal 102, a stop lamp signal 103 and a steering angle sensor signal 104 are supplied to the vehicle running state judgment unit 503. Then, an alarm generating signal 105 and a brake drive signal 106 are output from the actuator drive unit 504.

Figure 3:
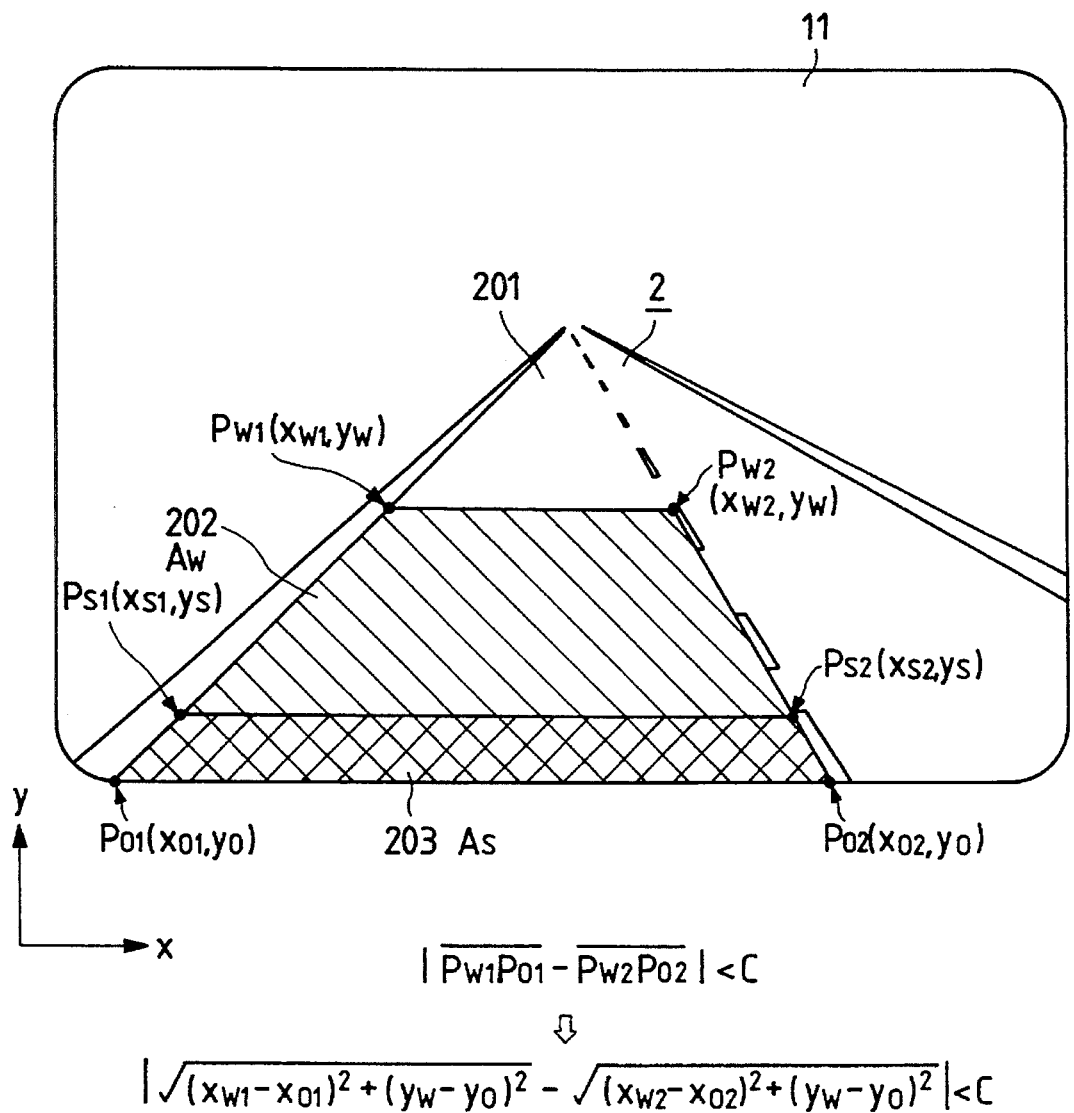
FIG. 3 diagrammatically shows an example of a display on a window which is processed by a picture processing unit of the present invention.

FIG. 3 shows the situation in which the processed information concerning the front road 2 picked up by the picture pickup device 3 is displayed on a two dimensional window 11 when a preceding vehicle does not exist. A personal area 202 of trapezoid shape formed by four points $P_{W1}$, $P_{W2}$, $P_{S1}$, $P_{S2}$ and a smaller personal area 203 of trapezoidal shape formed by four points $P_{S1}$, $P_{S2}$, $P_{o1}$, $P_{o2}$ are located in a lane 201 of the subject vehicle. The points $P_{W1}$, $P_{S1}$, $P_{o1}$ and the points $P_{W2}$, $P_{S2}$, $P_{o2}$ are contiguous internally with the right and the left white lines, respectively, the coordinates of which are represented by $(x_{W1}, y_W)$, $(x_{S1}, y_S)$, $(x_{o1}, y_o)$, $(x_{W2}, y_W)$, $(x_{S2}, y_S)$ and $(x_{o2}, y_o)$.

The values of $y_W$, $y_S$ and $y_o$ are predetermined and stored in the memory 502 of the control unit 5 in advance corresponding to the monitoring position and angle of the picture pickup device 3. The values of $y_W$ and $y_S$ are set so that the distance between the preceding vehicle and the subject vehicle is a safe one for a vehicle running in a traffic snarl, if the preceding vehicle exists in the upper area above the $y_W$, and the position distance between the vehicles is a dangerous one which may cause a vehicle collision, if the preceding vehicle exists in the lower area below the position $y_S$. The position $y_o$ is set to the lowest position in the window 11.

The difference DL between the right and the left white line segments cut by the two horizontal lines represented by the coordinates $y_W$ and $y_S$ is expressed by Eq.1.

$$|\overline{P_{W1}P_{o1}} - \overline{P_{W2}P_{o2}}| \quad (1)$$

DL is calculated and compared with a predetermined first threshold value $c_1$ and a predetermined second threshold value $c_2$ larger than the $c_1$.

In the following, operations of the embodiment are described.

Figure 4:
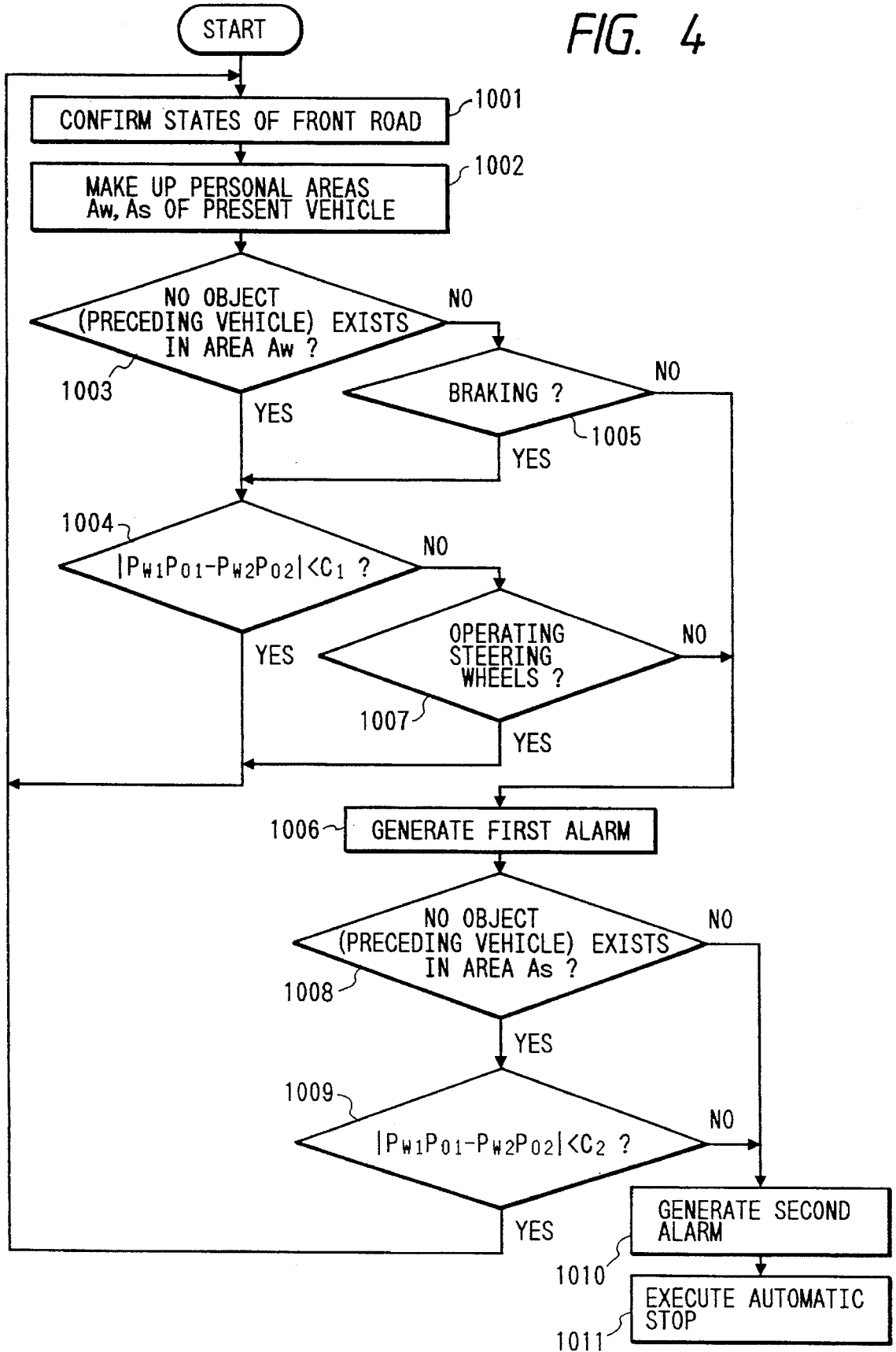
FIG. 4 is a flow chart which shows a control flow of running operations of the control unit of the present invention in the case of a traffic snarl.

Firstly, FIG. 4 shows a control flow of the subject vehicle in the running state, the running state being determined using the wheel rotation speed sensor signal 102. After a road is recognized by the picture pickup device 3 at the step 1001, the first personal area $A_w$ (202) and the second personal area $A_s$ (203) are established in the picture processing unit 502 at the step 1002. At the step 1003, it is judged whether or not an object, namely, a preceding vehicle, exists in the first personal area $A_w$. Then, if a preceding vehicle does not exist in the area $A_w$, as shown in FIG. 3, the process goes to the step 1004 of judging the difference between the right and the left white line segments. If the difference is smaller than the threshold value $c_1$, the road is judged as a straight road, as shown in FIG. 3, and the process goes back to the first step 1001.

Figure 5:
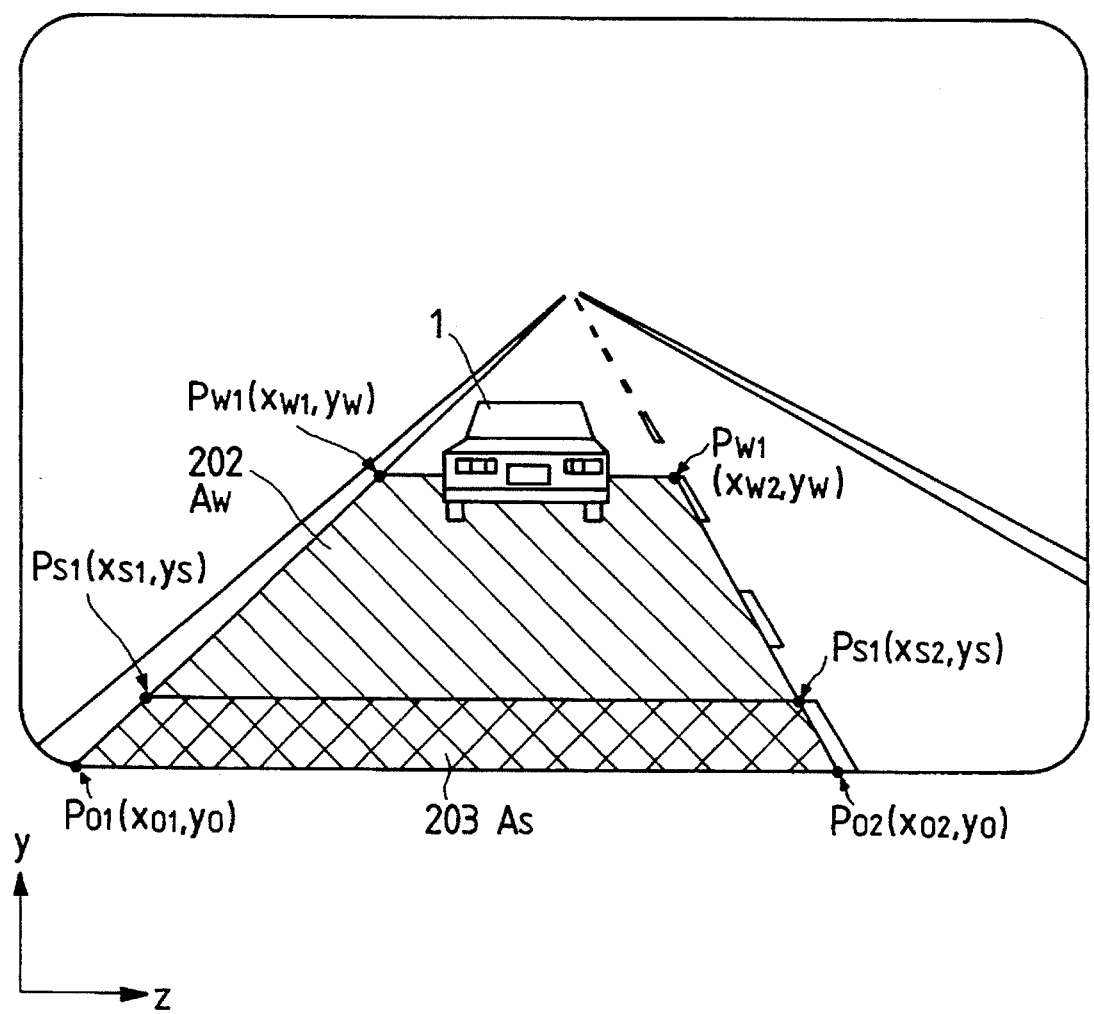
FIG. 5 diagrammatically shows a picture displaying the situation in which preceding vehicle exists in a first personal area as produced by the picture processing unit of the present invention.
Figure 6:
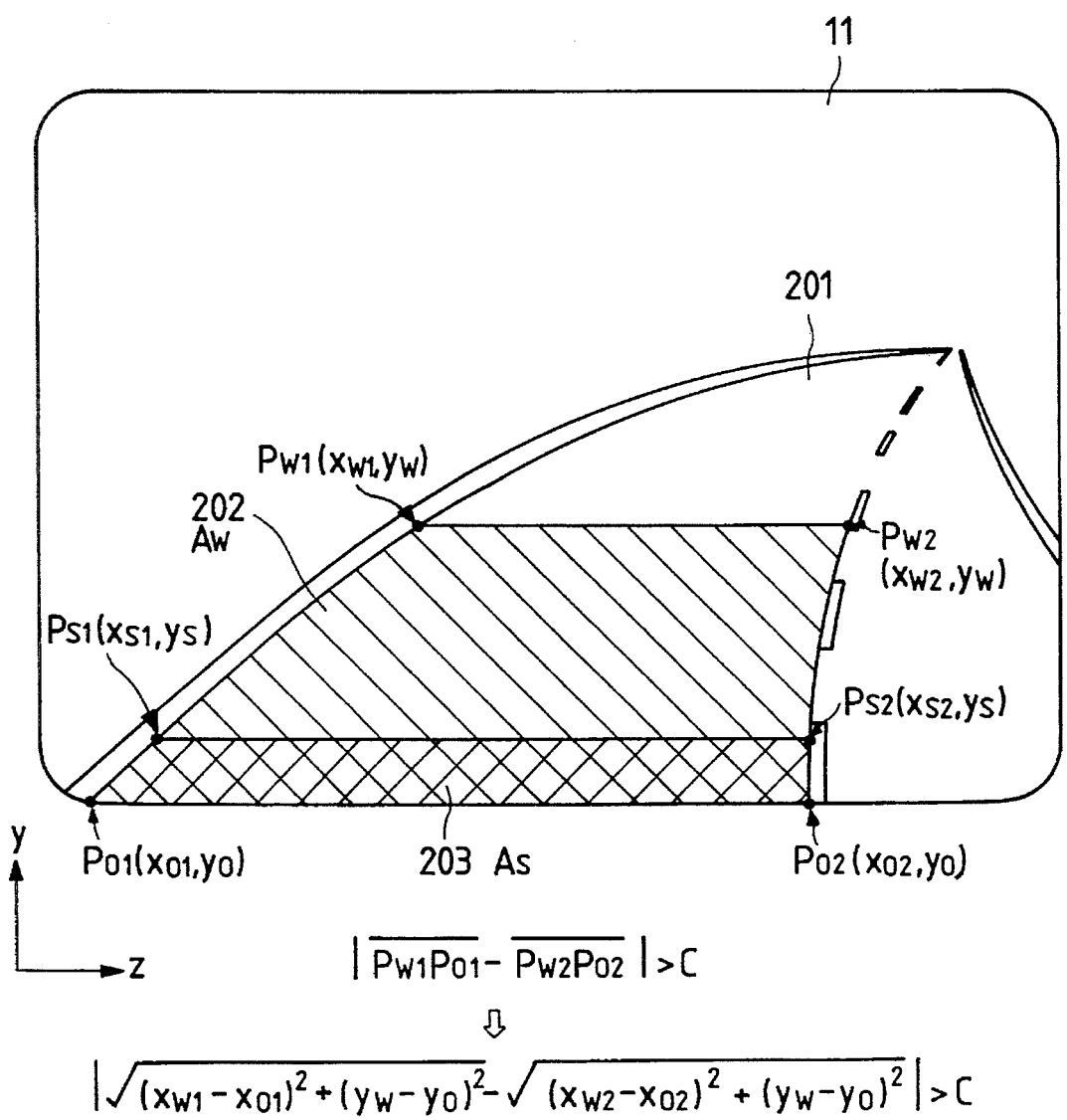
FIG. 6 diagrammatically shows a display on the window in the case of processing a curved road by the picture processing unit of the present invention.

On the other hand, if the judgment at the step 1003 is "NO", it is judged that a preceding vehicle 1 comes into the first personal area $A_w$ (202) as shown in FIG. 5, that is, it has slowed down or stopped, and the alarm unit 10 sends the first alarm for urging the operator to initiate to a braking operation in response to an alarm generating signal 105 if it is judged from the state of the stop lamp signal 103 that the braking operation of the subject vehicle is not already being carried out at the step 1005. And, if the judgment at the step 1004 is "NO", it is judged that the road is curved, as shown in FIG. 6, and the alarm unit 10 sends out a first alarm for urging the operator to initiate a steering operation in response to an alarm generating signal 105, if it is judged from the state of the steering angle signal 104 at the step 1007 that the steering operation of the present vehicle is not being carried out.

Figure 7:
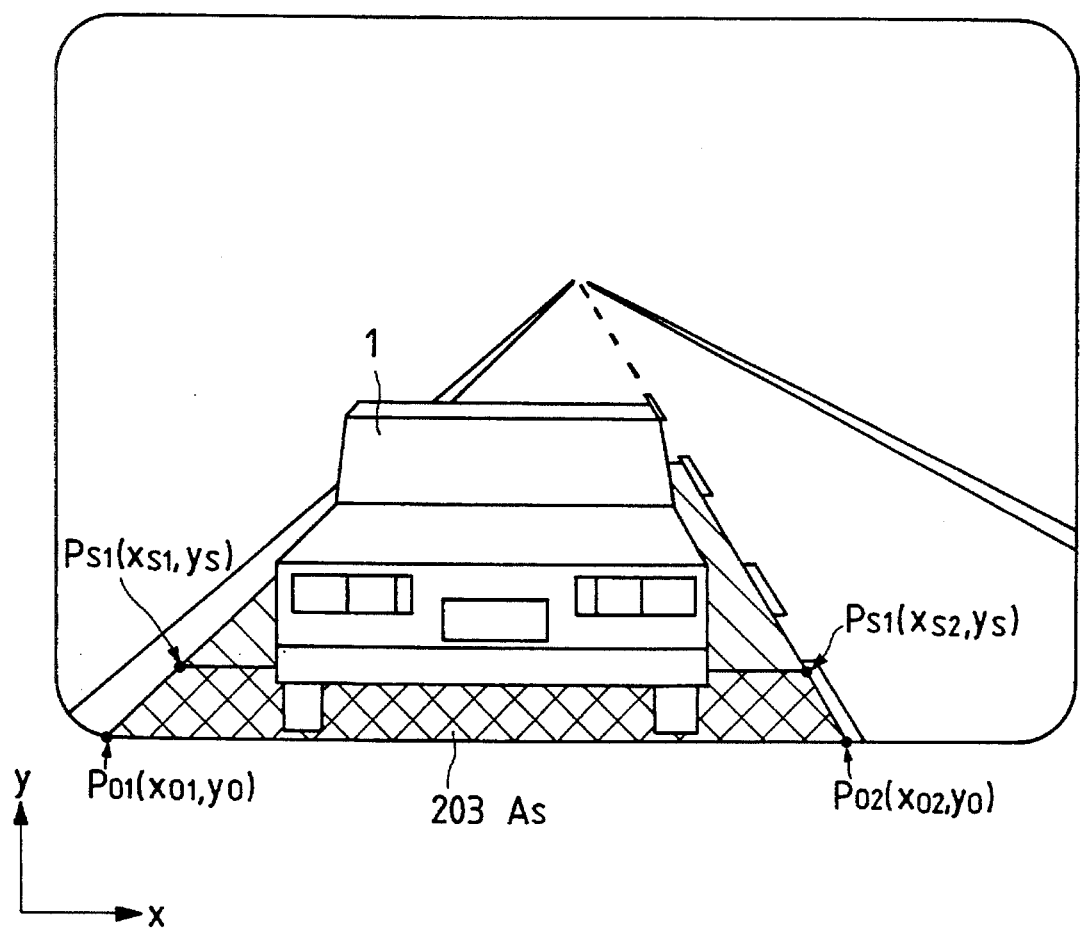
FIG. 7 diagrammatically shows a picture displaying the situation in which a preceding vehicle exists in a second personal area as produced by the picture processing unit of the present invention.

Furthermore, if, at the step 1008, it is judged that the operator has not initiated a braking or steering operation in spite of the first alarm and the preceding vehicle comes into the second personal area $A_s$ (203), as shown in FIG. 7, or if, at the step 1009, it is judged that the difference between the right and the left white line segment exceeds the second threshold value $c_2$, the second alarm is sent to the operator, since a vehicle collision or a wheel falling off may possibly occur. At the same time, the brake actuator 9 is driven by the brake drive signal 106 and the subject vehicle is automatically stopped at the step 1011.

Figure 8:
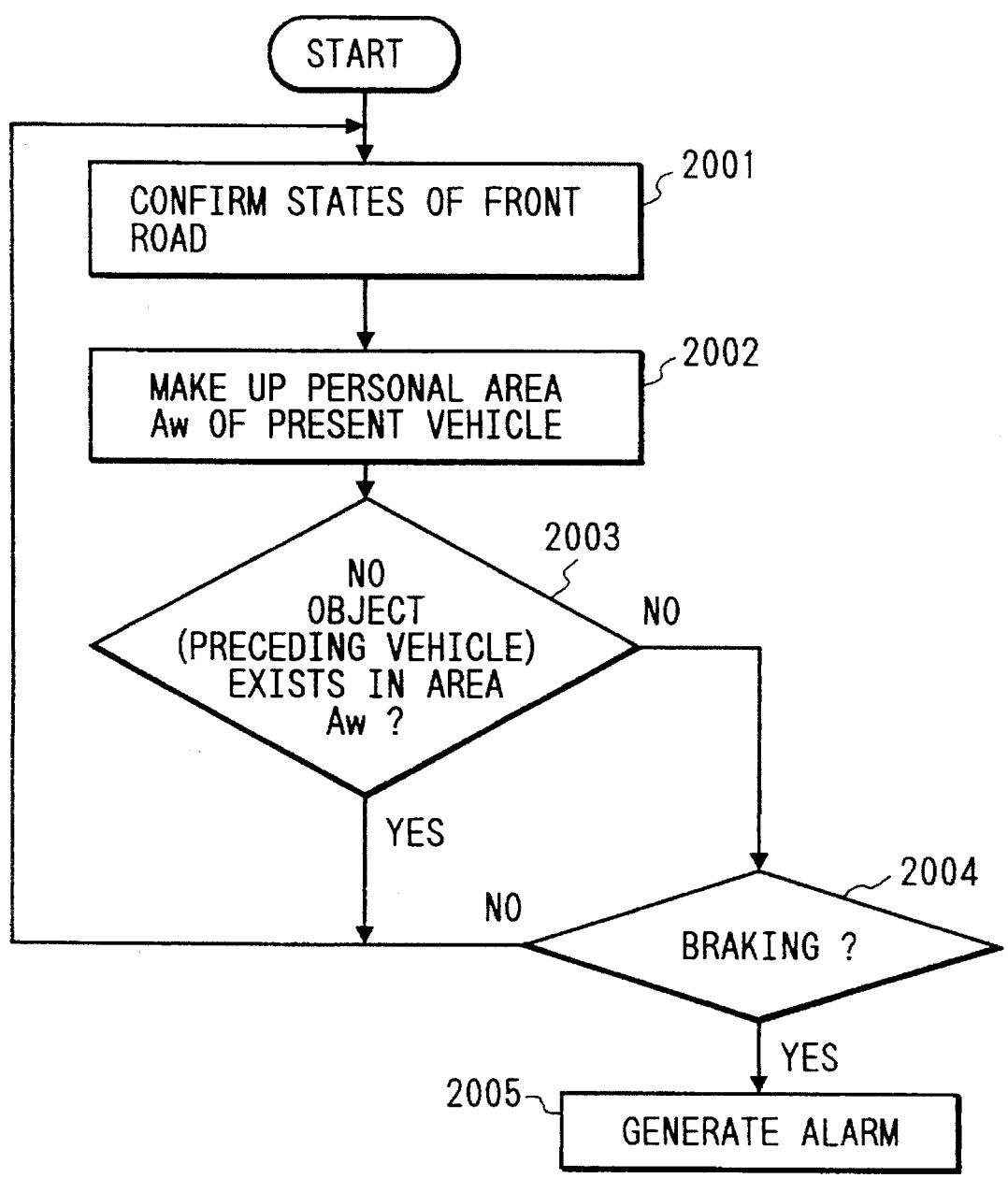
FIG. 8 is a flow chart which shows a control flow of stopping operations of the control unit of the present invention in the case of a traffic snarl.

FIG. 8 shows a control flow of the subject vehicle in the stopping state on a snarled road, in which the stopping state is determined by using the wheel rotation speed sensor signal 102.

After the presence of a road is picked up by the picture pickup device 3 at the step 2001, the first personal area $A_w$ (202) is established in the picture processing unit 501 at the step 2002. At the step 2003, it is judged whether or not an object, namely, a preceding vehicle exists in the first personal area $A_w$. Then, if a preceding vehicle exists in the area $A_w$, as shown in FIG. 5, it is judged that the preceding vehicle is also stopping and the distance between the vehicles is too short for starting of the subject vehicle, and the process goes back to the first step 2001.

On the other hand, if, at the step 2003, the judgment is "NO", it is judged that the preceding vehicle has started and enough distance between the vehicles is ensured, and so on alarm for urging the operator release the braking is sent by the alarm generating signal 105 at the step 2005, if, at the step 2004, it is judged from the state of the stop lamp signal 103 that braking of the subject vehicle is maintained.

As mentioned above, in accordance with the present invention, picture information input to the picture processing unit 501 can be decreased, since only one picture pickup device is needed as a sensor for detecting the situation of a road in front of the subject vehicle, and information to be dealt with in the picture processing is greatly reduced compared with conventional methods since the preceding vehicle is dealt with as only an object, other than a part of a road surface (a personal area). By the above-mentioned features, downsizing of the control unit can be realized, which can present a small size, light and cheap system.

Furthermore, the fatigue and stress of an operator can be mitigated by enjoying a meal or reading in a traffic snarl, since the alarm for urging the operator's stopping or starting with adequate timing is given on stopping or starting of the preceding vehicle and on departing of the preceding vehicle from the lane of the subject vehicle.

Furthermore, an operator can avoid an accident due to his carelessness in a traffic snarl, since the brake is automatically operated and the subject vehicle is stopped if the danger of a vehicle collision or a wheel falling off is predicted when the operator does not become aware of the generated alarm.

Figure 9:
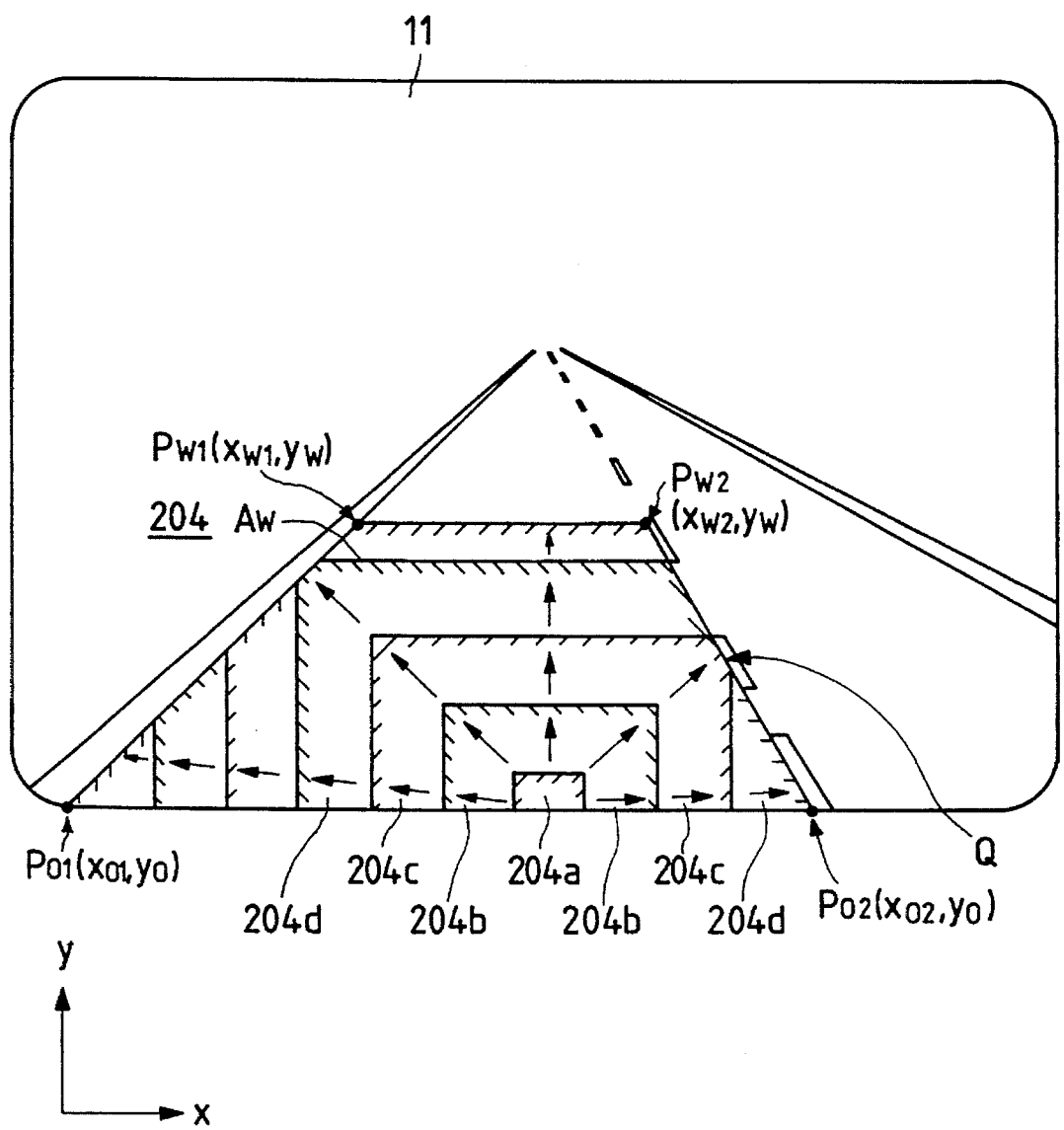
FIG. 9 is a diagram showing the personal area making up process performed by the picture processing unit of the present invention.

In the following, a method of making up the personal areas on the two dimensional window will be explained by referring to FIG. 9. Supposing that a road surface is always picked up at the center of the bottom part (y coordinate is $y_0$) in the horizontal direction, a small area 204a is set at the center. Then, the area is extended by the predetermined picture elements in the upper, right and left direction (204b). The extending operation is repeated as far as the same color and brightness is kept in the extended area. In the process of area extension, a part having another color is determined as a white line and extension of the area in the horizontal direction is stopped at that part (Q part of 204c) if another color appears in the extended area. In the upper direction (y direction), the extension is terminated when the extended area reaches a predetermined height $y_W$ and the personal area 204 is finally established.

By the embodiment, the computation load for picture processing can be reduced by efficiently making up the personal areas, that is, by always starting the area extension from a predetermined point of the window, without searching for a vehicle by scanning the picked up picture in the x and y directions.

In some cases, depending on the mounting position and angle of the picture pickup device, the hood of the vehicle is picked up at the center of the bottom part of the window. In such a case, the same effect of computation load reduction can be realized by setting the initial area 204a near the central upper part contacting the top of the hood and making up the personal area using same procedure as mentioned above.

In the following, an embodiment wherein a road gradient sensor 12 is provided will be explained with reference to FIG. 1 and FIG. 10. The picture pickup device 3 for picking up a preceding vehicle 1 and the front road 2 is connected to the control unit 5 via the A/D converter 4. The wheel rotation speed sensor 6, the stop lamp monitor 7 and the road gradient sensor 12 are connected to the input side of the control unit 5, and the brake actuator 9 and the alarm unit 10 to the output side of the control unit 5.

Figure 10:
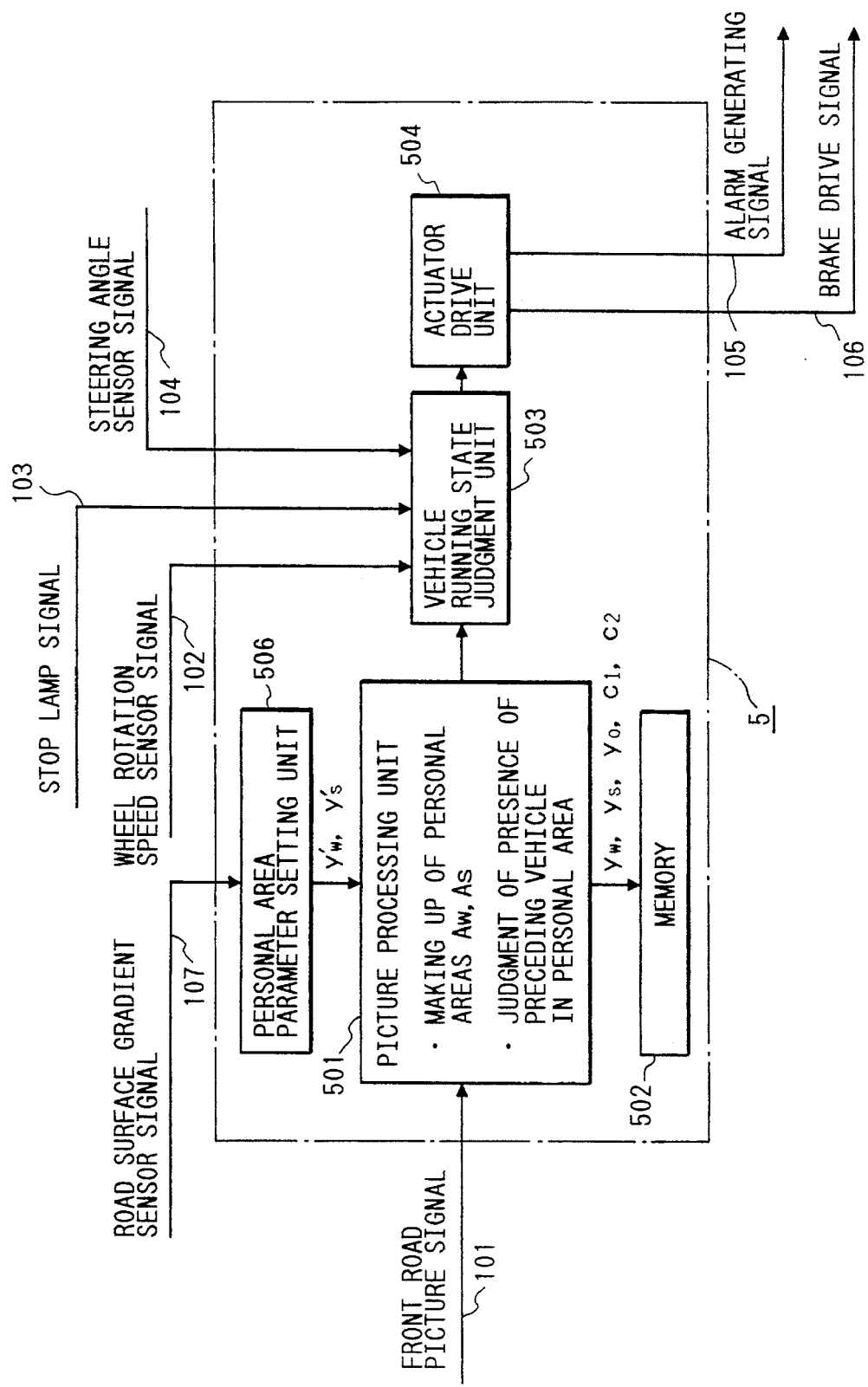
FIG. 10 is a block diagram which shows the main constitution of an apparatus and an operation support system of the present invention.

As shown in FIG. 10, the control unit 5 is composed of the memory 502 for storing predetermined parameters ($y_W$, $y_S$, $y_o$, $c_1$, $c_2$), a personal area parameter setting unit 506 for correcting and setting the y coordinates $y_W$ and $y_S$ of the personal area corresponding to a road gradient sensor signal 107, an actuator drive unit 504, a vehicle running state judgment unit 503 for judging running states of a vehicle and several kinds of memories which are not shown in the figure.

Picture signals 101 converted to digital signals by the A/D converter 4 are input into a picture processing unit 501, the road gradient sensor signal 107 is input into the personal area parameter setting unit 506, and a wheel rotation speed sensor signal 102, a stop lamp signal 103 and a steering angle sensor signal 104 are input into the vehicle running state judgment unit 503. Then, a alarm generating signal 105 and a brake drive signal 106 are output from the actuator drive unit 504.

FIG. 3 shows the situation in which information concerning the front road 2 picked up by the picture pickup device 3 is displayed on the two dimensional window 11 when a preceding vehicle does not exist. The personal area $A_W$ (202) of trapezoidal shape formed by four points $P_{W1}$, $P_{W2}$, $P_{S1}$, $P_{S2}$, and the smaller personal area $A_S$ (203) of trapezoidal shape formed by four points $P_{S1}$, $P_{S2}$, $P_{o1}$, $P_{o2}$ are disposed in a lane 201 of the subject vehicle. The points $P_{W1}$, $P_{S1}$, $P_{o1}$ and the points $P_{W2}$, $P_{S2}$, $P_{o2}$ are contiguous internally to the right and the left white lines, respectively, each coordinate of which is represented by $(x_{W1}, y_W)$, $(x_{S1}, y_W)$, $(x_{o1}, y_o)$, $(x_{W2}, y_w)$, $(x_{S1}, y_W)$ and $(x_{o2}, y_o)$. The coordinates $y_W$ and $y_S$ are changed in accordance with the road gradient as shown in FIG. 11. For example, in the case of a road gradient increase at a descendant road, the values of $y_W$ and $y_S$ are corrected and set by the personal area parameter setting unit 506 so that the values of $y_W$ and $y_S$ increase corresponding to the gradient increase. Further, it is also possible to directly set the values of $y_W$ and $y_S$ as a function of the road gradient and to set the value of $Y_o$ as the y coordinate of the bottom of the window 11.

In the following, operations of the embodiment are described.

Firstly, FIG. 12 shows a control flow of the subject vehicle in the running state of the present vehicle, the running state being determined by using the wheel rotation speed sensor signal 102. After the situation of the road is recognized by the picture pickup device 3 at the step 3001, the values of $y_W$ and $y_S$ are set by the personal area parameter setting unit 506 in accordance with the road gradient obtained from the road gradient sensor signal 107 at the step 3002 and the first personal area $A_w$ (202) and the second personal area $A_s$ (203) are established in the picture processing unit 502 at the step 3003. At the step 3004, it is judged whether an object, namely, a preceding vehicle exists or not in the first personal area $A_w$. Then, if a preceding vehicle does not exist in the area $A_w$, as shown in FIG. 3, the process goes back to the first step 3001.

On the other hand, if the judgment at the step 3004 is "NO", it is judged that a preceding vehicle 1 is present in the first personal area $A_w$ (202) as shown in FIG. 5, that is, it has slowed down or stopped, and the alarm unit 10 sends a first alarm for urging the operator to initiate a braking operation in response to the alarm generating signal 105 at the step 3006, if it is judged from the state of the stop lamp signal 103 that the braking operation of the subject vehicle has not been initiated at the step 3005.

Furthermore, if, at the step 3007, it is judged that the operator does not initiate a braking or steering operation in spite of the first alarm and the preceding vehicle comes into the second personal area $A_s$ (203), a second alarm is sent to the operator, since a vehicle collision may possibly occur at the step 3008, and then, at the same time, the brake actuator 9 is driven by the brake drive signal 106 and the vehicle is automatically stopped at the step 3009.

Figure 13A:
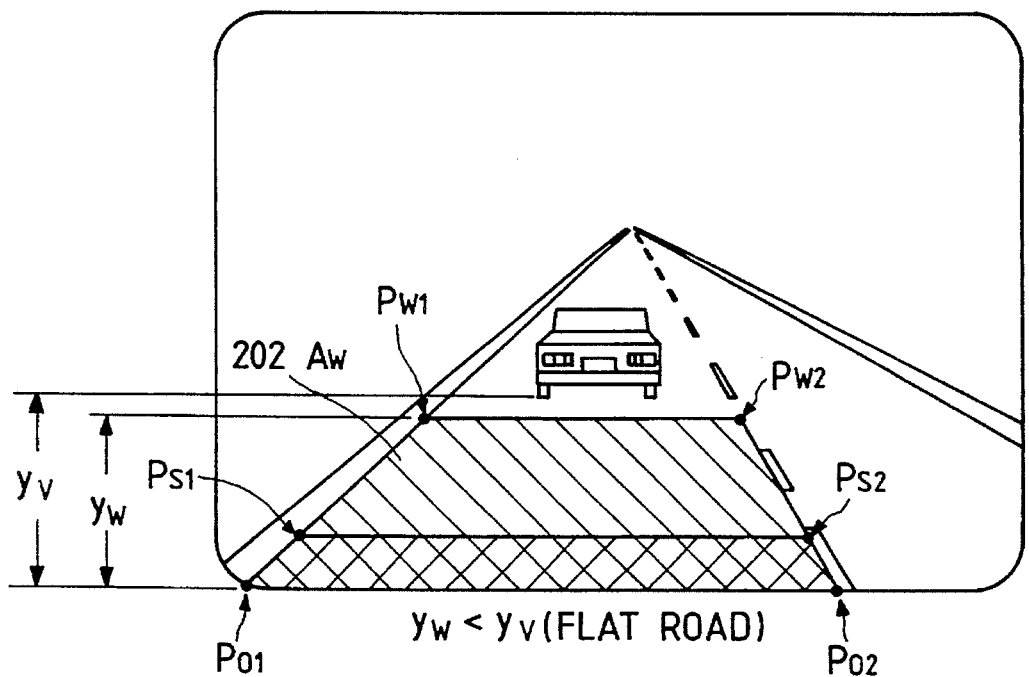
FIG. 13(a) is a diagram showing the relation between the position of a preceding vehicle existing outside the personal area and the position of the subject vehicle.
Figure 13B:
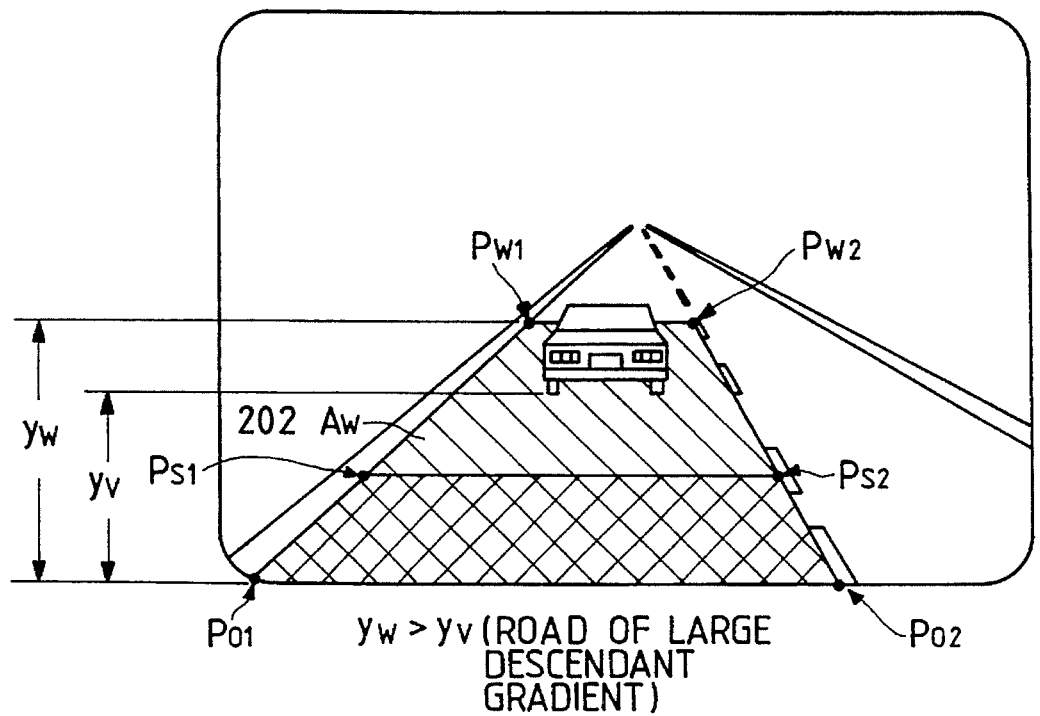
FIG. 13(b) is a diagram showing the relation between the position of a preceding vehicle existing inside the personal area and the position of the subject vehicle.

FIGS. 13(a) and 13(b) show a comparison of processing states displayed on the window of the picture processing unit 501 for the case of a flat road and the case of a large descendant gradient road, wherein the position of the preceding vehicle has the same y coordinate $y_V$, that is, the distance between the vehicles is the same in the both cases. In the case of a flat as shown by FIG. 13(a), the alarm is not generated since the y coordinate $y_W$ of the first personal area is below the y coordinate $y_V$ of the preceding vehicle. On the other hand, in the case of a large descendant gradient road as shown by FIG. 13(b), the alarm is generated since the $y_W$ is above the position $y_V$. Since the personal area is enlarged in accordance with the gradient in a descendant road, the alarm is generated earlier and safer braking can be realized.

In the following, another embodiment is explained with reference to FIGS. 1, 14, and 15.

Figure 14:
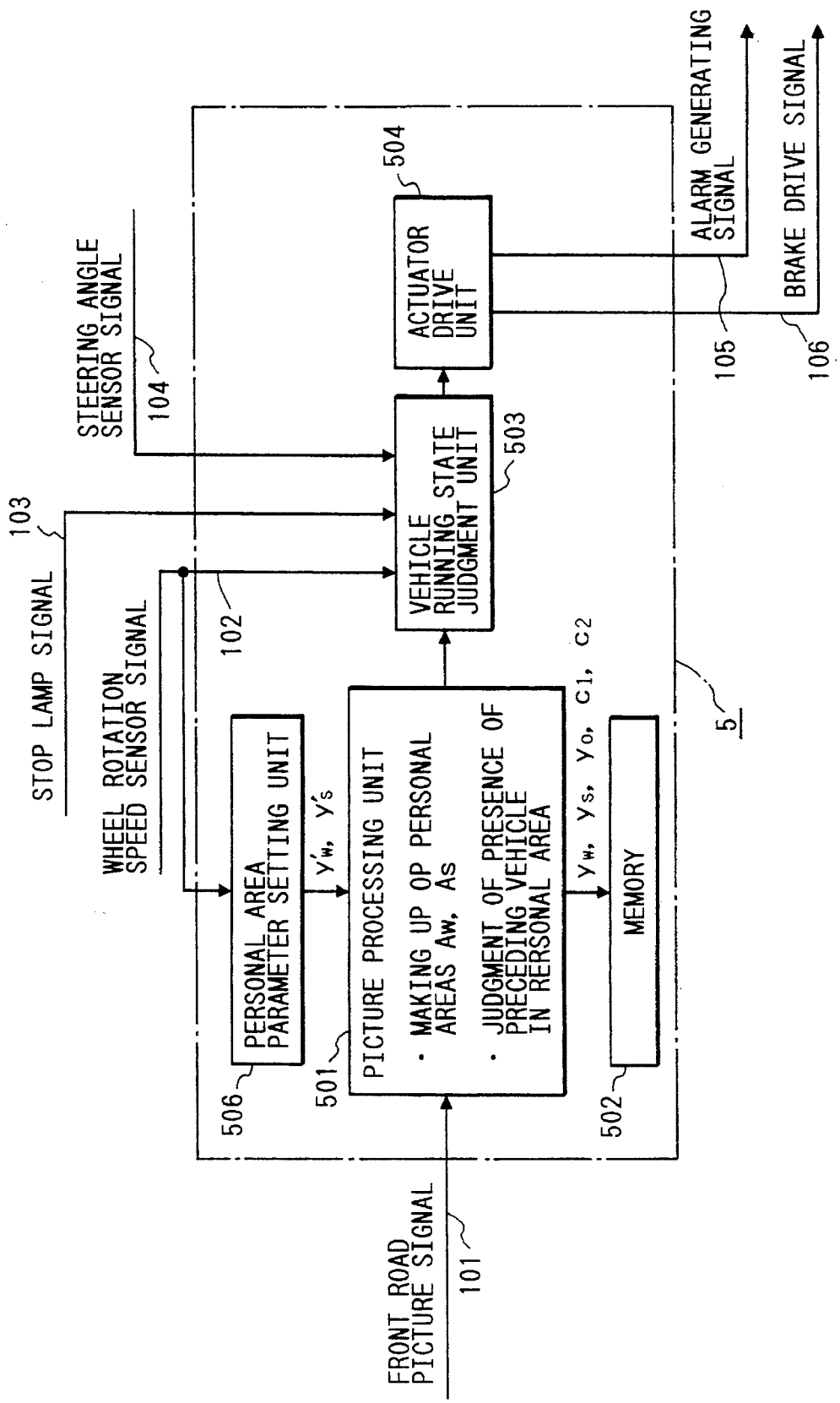
FIG. 14 is a block diagram which shows the constitution of a control unit in accordance with the present invention.
Figure 15:
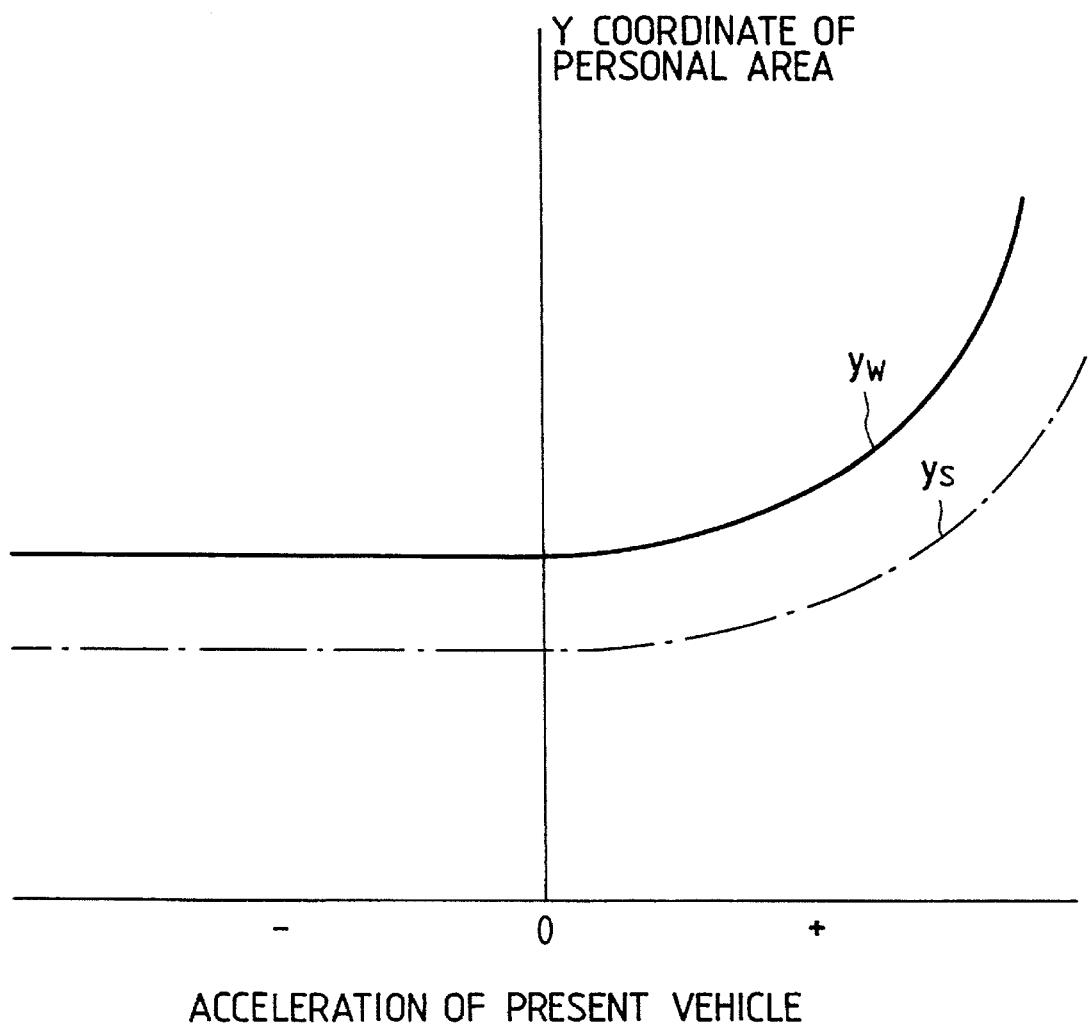
FIG. 15 is a diagram showing the relation between Y coordinates of the personal areas and the acceleration of the subject car in accordance with the present invention.

FIG. 1 shows the constitution of this embodiment, while details of the embodiment are shown by FIG. 14, wherein the wheel rotation speed 102 is input into both the vehicle running state judgement unit 503 and the personal area parameter setting unit 506. Furthermore, the acceleration of the vehicle is obtained, for example, by differentiating the wheel rotation speed sensor signal. Then, the degree of the road surface gradient is estimated, and the process from setting the personal areas to generating the alarm or driving the brake is executed according to the same process flow as the flow described in the above-mentioned embodiment (as shown by FIG. 12). In the embodiment, as shown in FIG. 15, it is judged that the road is descendant if the acceleration is positive, that is, the wheel rotation speed increases, and the y coordinate $y_W$ of the first personal area and the y coordinate $y_S$ of the second personal area are increased corresponding to the increase of the acceleration.

By this embodiment, the same effects as the above-mentioned embodiment can be attained and further cost reduction of the apparatus is possible, since the road surface gradient sensor becomes dispensable.

As explained above, by the present invention, the judgment as to a safe distance between vehicles is obtained based on only the determination as to whether or not an object other than a road, namely, a preceding vehicle exists in a predetermined area on a road surface. By the feature of the present invention, it is possible to considerably reduce the memory capacity and the amount of processed information and to offer a downsized, light and cheap operation support system.

What is claimed is:

1. A vehicle operation support system, comprising:

a picture pickup device attached to a vehicle for picking up a picture of a road surface in front of the vehicle so that the lane position of the vehicle is arranged almost at the center of the picked up picture;

a control unit, including a picture processing unit, for processing picture data picked up by said picture pickup device, a vehicle running state judgment unit for judging states of said vehicle and an actuator drive unit; and an alarm unit for generating alarms;

whereby said picture processing unit generates display data representing a trapezoidal personal area enclosed by right and left white lines of a lane of said vehicle and two preset horizontal lines to represent a picture of the road surface in front of the vehicle, and wherein said actuator drive unit is operated and an alarm for urging an operator to initiate a steering operation is generated from said alarm unit, when a difference between lengths between said right and said left line type marks of said trapezoidal personal area exceeds a predetermined first threshold value.

2. A vehicle operation support system corresponding to claim 1, wherein braking of said vehicle is automatically carried out by said actuator drive unit and said vehicle is stopped when said steering operation is not executed by said operator after said alarm and said difference between lengths between said right and said left line type marks of said trapezoidal personal area exceeds a predetermined second threshold value larger than said predetermined first threshold value.

3. A vehicle operation support system corresponding to claim 1, wherein the size of said personal area is changed in accordance with a gradient of said road surface on which said vehicle is running.

4. A vehicle operation support system corresponding to claim 1, wherein the size of said personal area is changed in accordance with speed changes of said vehicle during in running operation.

5. A vehicle operation support system corresponding to claim 3, wherein, in a creep running operation of said vehicle, said personal area is lengthened in the running direction if acceleration of said vehicle becomes larger in the absence of an accelerating operation by the operator, and said personal area is shortened in the running direction if acceleration of said vehicle becomes smaller in absence of a braking operation in creep running operation of said vehicle.

* * * * *

UNITED STATES PATENT AND TRADEMARK OFFICE
CERTIFICATE OF CORRECTION

PATENT NO.   : 5,612,686
DATED        : March 18, 1997
INVENTOR(S)  : Takano et al.

It is certified that error appears in the above-indentified patent and that said Letters Patent is hereby corrected as shown below:

On the title page, item [56], right-hand column, in the line following the last listed U. S. patent document number, insert the following:

-- FOREIGN PATENT DOCUMENTS

| | | |
|---|---|---|
| 4107177 | 3/1991 | Germany |
| 4140327 | 12/1991 | Germany |
| 3820589 | 6/1988 | Germany |
| 1-281600 | 11/1989 | Japan |
| 3-219398 | 9/1991 | Japan |
| 5-143898 | 6/1993 | Japan -- |

In claim 1, line 14, delete "white lines" and insert --line type marks indicating boundaries--.

In claim 4, line 3, delete "in" and insert --a--.
         line 32, after "in" insert --creep--.
At the end of column 8, please enter the following claims:

--6. A vehicle operation support system corresponding to claim 1, wherein said personal area is developed by extending, to said right and said left line type marks, and to a lower horizontal level of said upper horizontal line, preset in a window for displaying said picture of said road surface, and an upper horizontal level at which a part other than said road surface is found, an area having almost the same chromaticity and brightness as said road surface, from a part of said picture near the center of the bottom of said window.

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

7. A vehicle operation support system corresponding to claim 1, wherein said personal area is developed by extending, to said right and said left line type marks, and to a lower horizontal level of said upper horizontal line, preset in a window for displaying said picture of said road surface, and an upper horizontal level at which a part other than said road surface is found, an area having almost the same chromaticity and brightness as said road surface, from almost a central upper part contacting the top of the hood of said vehicle as picked up at the bottom of said window.

8. A vehicle operation support system corresponding to claim 1, wherein the size of said personal area is automatically changed in accordance with a predetermined relation between an area elongating amount and measured speed changes of said vehicle during a creep running operation.

9. A vehicle operation support system, comprising:
    a picture pickup device attached to a vehicle for picking up a picture of a road surface in front of the vehicle so that the lane position of the vehicle is arranged almost at the center of the picked up picture;
    a control unit, including a picture processing unit, for processing picture data picked up by said picture pickup device, a vehicle running state judgment unit for judging states of said vehicle and an actuator drive unit; and
        an alarm unit for generating alarms;
    wherein said picture processing unit produces display data representing a trapezoidal personal area enclosed by

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

right and left line type marks indicating boundaries designating a lane of said vehicle and two preset horizontal lines to represent a picture of the road surface in front of the vehicle, and wherein said actuator drive unit is operated and an alarm for urging an operator of the vehicle to initiate a braking operation is generated from said alarm unit when an object other than a road comes into said personal area;

wherein said personal area is developed by extending, in left, right and upper directions, an area having almost the same chromaticity and brightness as said road surface, from a part of said picture near the center of the bottom of a window for displaying said picture of said road surface.

10. A vehicle operation support system, comprising:
a picture pickup device attached to a vehicle for picking up a picture of a road surface in front of the vehicle so that the lane position of the vehicle is arranged almost at the center of the picked up picture;
a control unit, including a picture processing unit, for processing picture data picked up by said picture pickup device, a vehicle running state judgment unit for judging states of said vehicle and an actuator drive unit; and
an alarm unit for generating alarms;
wherein said picture processing unit produces display data representing a trapezoidal personal area enclosed by right and left line type marks indicating boundaries designating a lane of said vehicle and two preset horizontal lines to represent a picture of the road surface in front of the vehicle, and wherein said actuator drive unit is operated and an alarm for urging an operator of the vehicle

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

to initiate a braking operation is generated from said alarm unit when an object other than a road comes into said personal area,
 wherein the size of said personal area is automatically changed in accordance with a predetermined relation between an area elongating amount and measured speed changes of said vehicle during a creep running operation.

11. An apparatus for monitoring an area in the vicinity of a vehicle, comprising:
 a picture pickup device attached to said vehicle, for picking up objects located in the vicinity of said vehicle;
 a picture processing unit for recognizing a road surface in the running direction of said vehicle by using picture information picked up by said picture pickup device; and
 a judgment unit for generating signals indicating the appearance of a part, which is not determined as a part of said road surface, in a predetermined area of said road surface in the running direction of said vehicle,
 wherein said picture processing unit further includes means for recognizing said road surface by using chromaticity and brightness of picture elements in said picture information.

12. An apparatus for monitoring an area in the vicinity of a vehicle, comprising:
 a picture pickup device attached to said vehicle, for picking up objects located in the vicinity of said vehicle;

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

a picture processing unit for recognizing a road surface in the running direction of said vehicle by using picture information picked up by said picture pickup device and for producing road surface data;
    a memory for storing picture information representing a predetermined area in front of said vehicle as area data in advance; and
    a judgment unit for generating signals indicating the appearance of a part, which is not determined as a part of said road surface, in a predetermined area of said recognized road surface in the running direction of said vehicle by comparing said area data stored in said memory and said road surface data produced by said picture processing unit,
    wherein said picture processing unit further includes means for recognizing said road surface by using chromaticity and brightness of picture elements in said picture information.

13. A vehicle operation support system, comprising:
    a picture pickup device attached to a vehicle for picking up a picture of a road surface in front of the vehicle so that the lane position of the vehicle is arranged almost at the center of the picked up picture;
    a control unit, including a picture processing unit, for processing picture data picked up by said picture pickup device, a vehicle running state judgment unit for judging states of said vehicle and an actuator drive unit; and
    an alarm unit for generating alarms;
    whereby said picture processing unit produces display data representing a trapezoidal personal area enclosed by

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

right and left white lines of a lane of said vehicle and two preset horizontal lines to represent a picture of the road surface in front of the vehicle, and wherein said actuator drive unit is operated and an alarm for urging an operator to initiate releasing of a braking operation is generated from said alarm unit, when an object other than a road existing in said personal area goes out from said personal area, wherein said personal area is developed by extending, in left, right and upper directions, an area having almost the same chromaticity and brightness as said road surface, from a part of said picture near the center of the bottom of a window for displaying said picture of said road surface.

14. A vehicle operation support system, comprising:
a picture pickup device attached to a vehicle for picking up a picture of a road surface in front of the vehicle so that the lane position of the vehicle is arranged almost at the center of the picked up picture;
a control unit, including a picture processing unit, for processing picture data picked up by said picture pickup device, a vehicle running state judgment unit for judging states of said vehicle and an actuator drive unit; and
an alarm unit for generating alarms;
whereby said picture processing unit produces display data representing a trapezoidal personal area enclosed by right and left line type marks indicating boundaries of a lane of said vehicle and two preset horizontal lines to represent a picture of the road surface in front of the vehicle, and wherein said actuator drive unit is operated and an alarm for urging an operator to initiate releasing of

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

a braking operation is generated from said alarm unit, when an object other than a road existing in said personal area goes out from said personal area,
    wherein said personal area is developed by extending, in left, right and upper directions, an area having almost the same chromaticity and brightness as said road surface, from almost a central upper part contacting the top of the hood of said vehicle as picked up at the bottom of a window for displaying said picture of said road surface.

15. A vehicle operation support system, comprising:
    a picture pickup device attached to a vehicle for picking up a picture of a road surface in front of the vehicle so that the lane position of the vehicle is arranged almost at the center of the picked up picture;
    a control unit, including a picture processing unit, for processing picture data picked up by said picture pickup device, a vehicle running state judgment unit for judging states of said vehicle and an actuator drive unit; and
        an alarm unit for generating alarms;
    whereby said picture processing unit produces display data representing a trapezoidal personal area enclosed by right and left line type marks indicating boundaries of a lane of said vehicle and two preset horizontal lines to represent a picture of the road surface in front of the vehicle, and wherein said actuator drive unit is operated and an alarm for urging an operator to initiate releasing of a braking operation is generated from said alarm unit, when an object other than a road existing in said personal area goes out from said personal area,

UNITED STATES PATENT AND TRADEMARK OFFICE
CERTIFICATE OF CORRECTION

PATENT NO. : 5,612,686
DATED : March 18, 1997
INVENTOR(S) : Takano et al.

It is certified that error appears in the above-indentified patent and that said Letters Patent is hereby corrected as shown below:

wherein the size of said personal area is automatically changed in accordance with a predetermined relation between an area elongating amount and measured speed changes of said vehicle during a creep running operation.--

Signed and Sealed this

Twenty-third Day of February, 1999

Attest:

Q. TODD DICKINSON

Attesting Officer     Acting Commissioner of Patents and Trademarks

REEXAMINATION CERTIFICATE (4444th)

United States Patent
Takano et al.

(10) Number: US 5,612,686 C1
(45) Certificate Issued: Sep. 18, 2001

(54) METHOD AND AN APPARATUS FOR MONITORING THE ENVIRONMENT AROUND A VEHICLE AND AN OPERATION SUPPORT SYSTEM USING THE SAME

(75) Inventors: Kazuaki Takano, Mito; Naoyuki Tanaka, Abiko; Makoto Shioya, Tokyo; Takuya Imaide, Fujisawa; Kenichirou Kurata, Katsuta, all of (JP)

(73) Assignee: Hitachi, Ltd., Tokyo (JP)

Reexamination Request:
No. 90/005,340, May 25, 1999

Reexamination Certificate for:
Patent No.: 5,612,686
Issued: Mar. 18, 1997
Appl. No.: 08/313,777
Filed: Sep. 28, 1994

Certificate of Correction issued Feb. 23, 1999.

(30) Foreign Application Priority Data

Sep. 28, 1993 (JP) ................................. 5-240939

(51) Int. Cl.$^7$ ........................................ G08G 1/16
(52) U.S. Cl. ...................... 340/903; 180/169; 340/435; 348/148; 348/170
(58) Field of Search ............................ 340/901, 903, 340/435; 356/4.01, 4.03, 3, 14; 395/131; 382/106, 103, 154, 104; 180/169; 348/148, 149, 169, 170, 113, 118; 701/301, 117

(56) References Cited

U.S. PATENT DOCUMENTS

| | | | |
|---|---|---|---|
| 5,296,852 | * 3/1994 | Rathi | 340/933 |
| 5,410,340 | 4/1995 | Saneyoshi et al. | 348/116 |
| 5,530,771 | * 6/1996 | Maekawa | 340/435 |
| 5,535,314 | * 7/1996 | Alves et al. | 395/131 |
| 5,706,355 | * 1/1998 | Raboisson et al. | 382/104 |
| 5,937,079 | * 8/1999 | Franke | 382/103 |

* cited by examiner

Primary Examiner—Brent A. Swarthout

(57) ABSTRACT

Safety of the distance between vehicles is judged by monitoring whether or not an object other than a front road surface, namely, a prceeding vehicle, exists in a predetermined area of the front road surface which is recognized by a picture processing unit used as a sensor by recognizing traffic states of the front road, without recognizing an image of a preceding vehicle having a complicated shape and a plurality of colors of the preceding vehicle by means of picture processing.

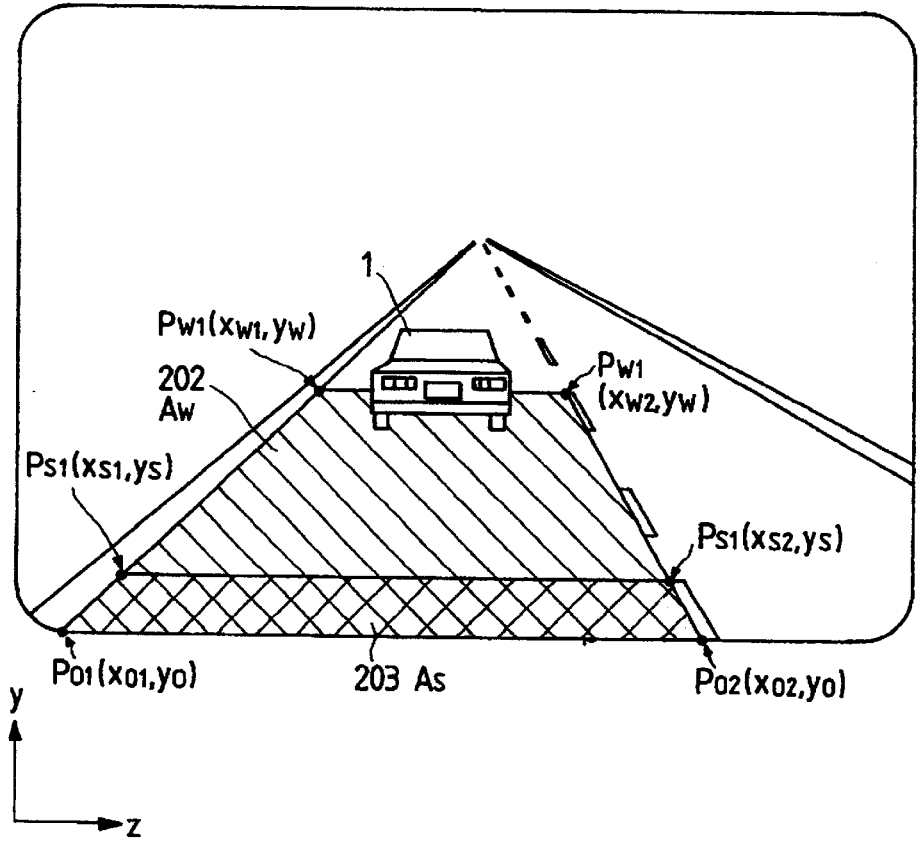

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9, 13 and 14 is confirmed.

Claims 11–12 are cancelled.

Claims 10 and 15 are determined to be patentable as amended.

10. A vehicle operation support system, comprising:

a picture pickup device attached to a vehicle for picking up a picture of a road surface in front of the vehicle so that the lane position of the vehicle is arranged almost at the center of the picked up picture;

a control unit, including a picture processing unit, for processing picture data picked up by said picture pickup device, a vehicle running state judgment unit for judging states of said vehicle and an actuator drive unit; and an alarm unit for generating alarms;

wherein said picture processing unit produces display data representing a trapezoidal personal area, *set in a picture of said road surface of said lane on which said vehicle is running,* enclosed by right and left line type marks indicating boundaries designating a lane of said vehicle and two preset horizontal lines to represent a picture of the road surface in front of the vehicle, and wherein said actuator drive unit is operated and an alarm for urging an operator of the vehicle to initiate a braking operation is generated from said alarm unit when an object other than a road comes into said personal area, wherein the size of said personal area is automatically changed in accordance with a predetermined relation between an area elongating amount and measured speed changes of said vehicle during a creep running operation.

15. A vehicle operation support system, comprising:

a picture pickup device attached to a vehicle for picking up a picture of a road surface in front of the vehicle so that the lane position of the vehicle is arranged almost at the center of the picked up picture;

a control unit, including a picture processing unit, for processing picture data picked up by said picture pickup device, a vehicle running state judgment unit for judging states of said vehicle and an actuator drive unit; and an alarm unit for generating alarms;

[whereby] *wherein* said picture processing unit produces display data representing a trapezoidal personal area, *set in a picture of said road surface of said lane on which said vehicle is running,* enclosed by right and left line type marks indicating boundaries of a lane of said vehicle and two preset horizontal lines to represent a picture of the road surface in front of the vehicle, and wherein said actuator drive unit is operated and an alarm for urging an operator to initiate releasing of a braking operation is generated from said alarm unit, when an object other than a road existing in said personal area goes out from said personal area, wherein the size of said personal area is automatically changed in accordance with a predetermined relation between an area elongating amount and measured speed changes of said vehicle during a creep running operation.

* * * * *